United States Patent
Vuilleumier et al.

(10) Patent No.: US 7,385,874 B2
(45) Date of Patent: Jun. 10, 2008

(54) WATCH WITH METALLIC CASE INCLUDING AN ELECTRONIC MODULE FOR STORING DATA, AND ELECTRONIC MODULE FOR SUCH A WATCH

(75) Inventors: Jean-Claude Vuilleumier, Cressier (CH); David Apotheloz, Corcelles (CH); Jacques Mueller, Reconvilier (CH); Clement Meyrat, Le Landeron (CH)

(73) Assignee: The Swatch Group Management Services AG, Biel (CH)

( * ) Notice: Subject to any disclaimer, the term of this patent is extended or adjusted under 35 U.S.C. 154(b) by 0 days.

(21) Appl. No.: 10/595,130

(22) PCT Filed: Aug. 24, 2004

(86) PCT No.: PCT/EP2004/009442

§ 371 (c)(1),
(2), (4) Date: Feb. 16, 2007

(87) PCT Pub. No.: WO2005/024528

PCT Pub. Date: Mar. 17, 2005

(65) Prior Publication Data

US 2007/0297294 A1    Dec. 27, 2007

(30) Foreign Application Priority Data

Sep. 2, 2003    (EP) .................................. 03019951

(51) Int. Cl.
*G04B 47/00* (2006.01)
*G04B 37/00* (2006.01)
*G04B 1/06* (2006.01)
*G06K 19/00* (2006.01)
*H01Q 1/12* (2006.01)

(52) U.S. Cl. .......................... 368/10; 368/47; 368/88; 368/281; 368/309; 343/718; 455/344

(58) Field of Classification Search ................ 368/10, 368/11, 47, 88, 281, 309; 343/718, 720; 455/90.3, 344, 347
See application file for complete search history.

(56) References Cited

U.S. PATENT DOCUMENTS 5,798,984 A * 8/1998 Koch ......................... 368/10

(Continued)

FOREIGN PATENT DOCUMENTS

DE    19613491 A1    10/1997

(Continued)

OTHER PUBLICATIONS

International Search Report in corresponding application PCT/EP2004/009442 completed Oct. 14, 2004 and mailed Nov. 5, 2004.

*Primary Examiner*—Vit W Miska
(74) *Attorney, Agent, or Firm*—Griffin & Szipl, P.C.

(57) ABSTRACT

The watch with a metallic case including an electronic module for storing data, which is mounted in an external cavity in the back cover of a case. The module can communicate via broadcast signals with a read and/or write apparatus for said data. The module includes a base on which are mounted an integrated circuit chip having at least two bumps and a coil acting as a transmission and/or reception antenna. The coil is formed by an electrically conductive wire having two ends respectively connected to said bumps of said integrated circuit chip. The coil surrounds a space in which said chip is placed. The dome-shaped base of the electronic module is a metallic element that conducts magnetic flux to insulate the module coil magnetically from the metallic case during data communication between a read/write apparatus and said module. The base of the module can be covered by a protective cover.

13 Claims, 4 Drawing Sheets

U.S. PATENT DOCUMENTS

| | | | |
|---|---|---|---|
| 6,164,815 A * | 12/2000 | Degonda | 368/278 |
| 6,724,690 B1 * | 4/2004 | Endo et al. | 368/10 |
| 6,853,605 B2 * | 2/2005 | Fujisawa et al. | 368/10 |
| 6,854,978 B2 * | 2/2005 | Noirjean | 439/37 |
| 2003/0117336 A1 | 6/2003 | Droz | |
| 2006/0104161 A1 * | 5/2006 | Stalder et al. | 368/309 |

FOREIGN PATENT DOCUMENTS

| | | |
|---|---|---|
| DE | 19946254 A1 | 4/2001 |
| EP | 1288016 A1 | 3/2003 |
| EP | 1347533 A1 | 9/2003 |
| EP | 1398676 A1 | 3/2004 |
| WO | 03052526 A1 | 6/2003 |

\* cited by examiner

WATCH WITH METALLIC CASE INCLUDING AN ELECTRONIC MODULE FOR STORING DATA, AND ELECTRONIC MODULE FOR SUCH A WATCH

This is a National Phase Application in the United States of International Patent Application No. PCT/EP2004/009442 filed Aug. 24, 2004, which claims priority on European Patent Application No. 03019951.7, filed Sep. 2, 2003. The entire disclosures of the above patent applications are hereby incorporated by reference.

FIELD OF THE INVENTION

The present invention concerns a watch with a metallic case, such as a wristwatch, including an electronic module for storing data. Said electronic module is housed at least mostly in a cavity that is open towards the exterior in an external surface of the watch and can communicate, via broadcast signals, with a read and/or write apparatus for said data. This module includes a base on which there are mounted an integrated circuit chip having at least two connection terminals and a coil acting as transmission and/or reception antenna. The coil is formed by an electrically conductive wire having two ends respectively connected to said connection terminals of said integrated circuit chip. The coil surrounds a space in which said chip is placed.

The invention also concerns the electronic module formed so as to be able to be positioned on an external surface of the metallic case of the watch, which is provided for this purpose.

BACKGROUND OF THE INVENTION

In the case of a wristwatch, electronic modules, for example for storing data, are generally placed inside the watchcase. These electronic modules include an integrated circuit chip connected to a coil acting as antenna for communicating with a read and/or write apparatus via broadcast signals. The read and/or write apparatus can be provided for at least reading the data contained in a memory of the integrated circuit chip or for removing or modifying at least a part of such data and adding further data.

More specifically, the invention relates to a metallic watchcase including a passive type electronic module. The term "passive" means that the module is not provided with its own energy source, such as a battery or an accumulator, to be able to operate. The electric energy of the module is provided by the signals broadcast by the read and/or write apparatus with which it cooperates.

Such watches are provided for example simply for storing an access code for private or protected buildings or ski slopes. Other watches with electronic modules fitted with more complicated integrated circuit chips can contain personal data, such as their owners' medical files.

In some known watches, the electronic module is placed in a hollow, preferably removable bezel, so that the module can be changed if necessary. This solution is not therefore suitable for watches having any type of case. Moreover, if the case includes a bezel or a middle part-bezel, this complicates the manufacture thereof and consequently increases the cost price of the watch.

In other watches, the module is placed in a space provided between the back of the movement of such watches and the back cover or their case, which necessarily increases the volume thereof. Moreover, if the back cover of the case is made of a material that is not non-magnetic, for example steel, the magnetic flux generated or received by the coil of the electronic module experiences significant losses. Even if measures are taken to limit such losses, they are still far from negligible. This reduces the communication distance between a read and/or write apparatus and the electronic module. Finally, even if the back cover of the case is made of a non-magnetic material, for example, plastic material, gold, silver or aluminium, the broadcast signals transmitted and received by the coil of the module which have to pass through the entire thickness of the back cover undergo significant attenuation It is thus a main object of the invention to overcome the drawbacks of the prior art by providing a watch with a metallic case including an electronic module arranged for attenuating interference due to the metallic watchcase during communication with a data read and/or write apparatus. Further, the watch module is arranged for increasing the read and/or write distance during communication with said apparatus.

SUMMARY OF THE INVENTION

The invention therefore concerns a watch with a metallic case including an aforecited electronic module for storing data which is characterized in that the base of the electronic module is a metallic element that conducts magnetic flux to insulate the module coil magnetically from the metallic case during data communication between a read/write apparatus and said module, and in that said module and said cavity that is open towards the exterior housing said module define means for quickly and precisely positioning a complementary-shaped head of a read and/or write apparatus.

Preferably, the watch with a metallic case is a wristwatch. Consequently, the metallic base must be made of a highly permeable material so as to act as a magnetic shield for the coil of said module. The part of the base on which the chip and the coil are mounted should preferably be positioned between the external surface of the watch receiving the module and the coil. In this manner, better attenuation of the interference due to the metallic case is obtained during communication with a data read and/or write apparatus.

Preferably, the base forms a flat-bottomed dome in which the coil and integrated circuit chip are mounted. The height of the lateral wall of said dome counted from the inner surface of the flat bottom is greater than the thickness of the coil and the chip so that the coil and the integrated circuit chip do not extend beyond the upper edge of said dome. In this manner, better magnetic shielding is obtained which enables the read and/or write distance between a read and/or write apparatus and said module to be increased.

An external cavity or blind hole can be made on an external surface of the watchcase to house therein most of said module. Preferably, this cavity has complementary shape to the base of said module. If the base is dome-shaped, the dome is introduced into said cavity such that the bottom of the dome comes into direct contact with the bottom of said cavity. This enables the coil of said module to be properly magnetically insulated from the metallic case.

The base can also be a simple plate on which the annular-shaped coil and the integrated circuit chip housed inside said coil are placed. Resin for encapsulating the integrated circuit chip can be placed in the space left free inside the coil. The module plate is positioned between the bottom of the cavity and the coil.

Preferably, a protective cover is placed on said base to enclose the coil and the integrated circuit chip using said base. This cover can be made of a neutral material like plastic or ceramics. In such case, only a part of the cover projects outside the cavity after said module has been introduced into said cavity.

Thus, unlike a watch, in which the module is placed inside the latter, the signals transmitted and received by the coil of the watch module according to the invention have only to pass through the protective cover of the module whose thickness is much less than that of the back cover of the watchcase for example.

It is possible to use an existing watch, and to form in the back cover thereof, particularly by milling, a blind hole or external cavity whose shape fits that of the electronic module. Consequently, the module can advantageously be mounted in the cavity after all of the manufacturing steps of the wristwatch.

Preferably, the cavity and the module have an essentially cylindrical shape and are located at the centre of the back cover of the case.

Owing to the base of the electronic module, the module can be placed on any external surface of the watch, whether the surface is made of a metallic or insulating material. The module is thus relatively well magnetically insulated when it is mounted on a case made of steel, aluminium, silver or another magnetic material.

It is also an object of the invention to overcome the drawbacks of the prior art by providing an electronic module for a watch with a metallic case. This module is arranged for attenuating interference due to the metallic case of the watch on which it can be mounted during communication with a data read and/or write apparatus.

Thus the invention concerns an electronic module of the type cited above, characterized in that the base is a metallic element that conducts magnetic flux to act as a magnetic shield.

BRIEF DESCRIPTION OF THE DRAWINGS

The objects, advantages and features of the watch with a metallic case, and the electronic module mounted on the watch will appear more clearly in the following description of non-limiting embodiments of the invention in conjunction with the drawings, in which.

DETAILED DESCRIPTION OF THE ILLUSTRATIVE EMBODIMENTS

Although the invention could evidently not be limited to an horological application, the following description will however be made with reference to a wristwatch fitted with an electronic module for storing data. The data stored or to be stored concerns the watch itself, and/or personal data of the person wearing said watch. The electronic module is intended to be placed at a very small distance (several millimetres at the most) from the coil that forms the transmission and/or reception antenna for a read and/or write apparatus with which it is made to communicate.

Figure 1:
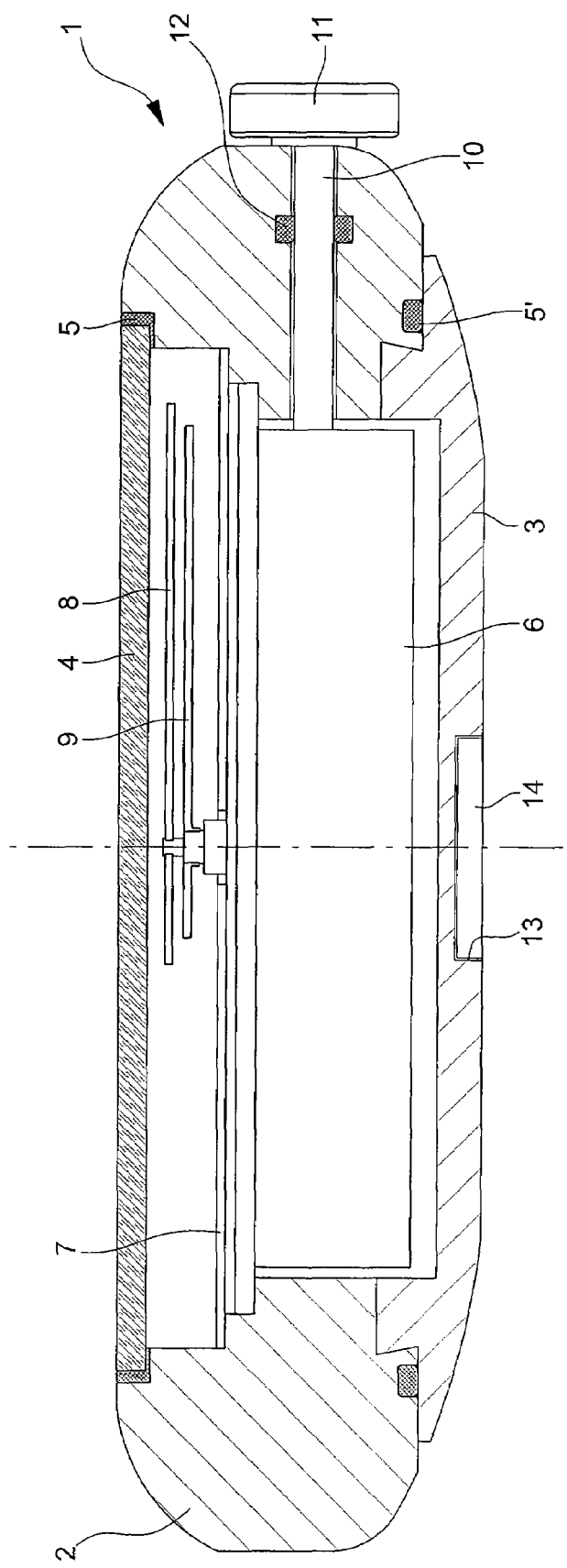
FIG. 1 shows a diametral schematic cross-section of an analogue display wristwatch, with an electronic module according to the invention.

The wristwatch is shown schematically in FIG. 1. It includes a metallic case designated by the general reference 1. This case 1 includes a metallic middle part-bezel 2, a back cover 3 that is also metallic and a crystal 4. The crystal is fixed in a conventional manner to the middle part-bezel 2 by compression by means of a sealing gasket 5, which at the same time seals the case at the crystal in a water-resistant manner.

As shown in FIG. 1, the back cover 3 is secured to middle part-bezel 2 by snap fitting but it could also be for example screwed on or fixed by a bayonet system, so as to compress a sealing gasket 5' which seals the case at the back cover in a water-resistant manner.

Finally, case 1 also includes a system for attaching a wristband or bracelet which is not visible in FIG. 1 and which can be formed by two pairs of horns of middle part-bezel 2.

A movement 6 is housed in watchcase 1, said movement driving a minute hand 8 and an hour hand 9 placed above of dial 7 and which includes a control stem 10 which passes through middle part-bezel 2 and ends in a crown 11, case 1 being sealed in a water-resistant manner by an annular gasket 12 at the place where the stem passes through the middle part-bezel. If the watch is not of the electromechanical or automatically wound type, stem 10 and crown 11 are also used for winding the watch.

Of course, the wristwatch can also be of the type with a timekeeper circuit and a digital time display.

According to the invention, the back cover 3 of case 1 has a cavity 13 that is open towards the exterior of the case and in which an electronic module 14 is partly housed. This cavity can for example be made simply by milling.

Given that, on the one hand, in the application envisaged here, electronic module 14 has a considerably smaller surface than that of the back cover of the case and that, on the other hand, the module can be made in different forms, it is represented in FIG. 1 simply by a rectangle. The module can have a thickness of the order of 1 mm and a diameter of the order of 6 mm.

Figure 2A:
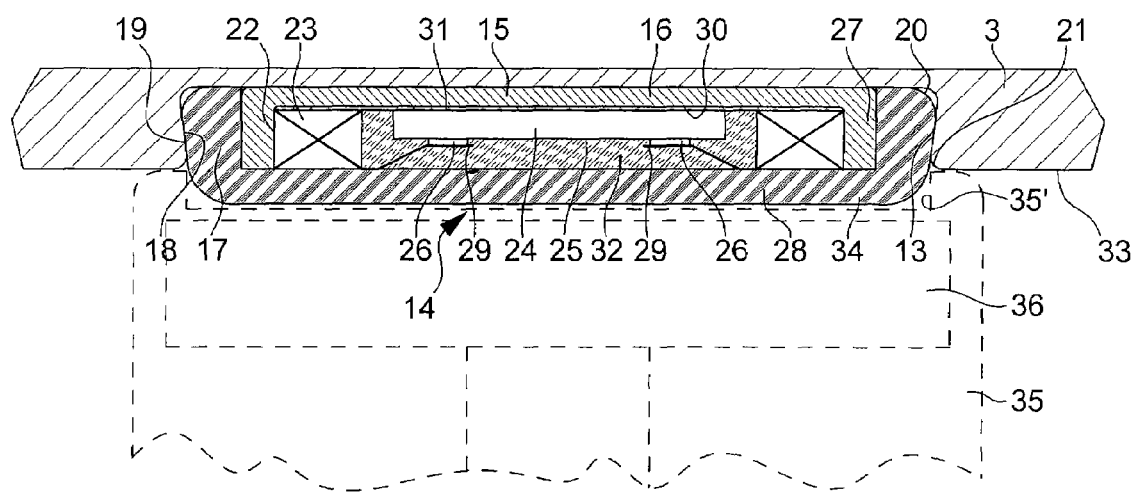
FIGS. 2a and 2b show an enlarged diametral cross-section of the area of the back cover of the case of FIG. 1 in which an electronic module according to a first embodiment is incorporated, and an incomplete bottom view of the electronic module without a protective cover.

FIG. 2a is an enlarged cross-section of the area of the back cover 3 of the case 1 of FIG. 1 which shows a first embodiment of electronic module 14 which can be inserted in a durable manner in cavity 13 of the back cover.

In this embodiment, module 14 mainly includes a base 15 on which are mounted a coil 23 acting as antenna for data communication and an integrated circuit chip 24 connected to the coil. The base is a metallic element that conducts magnetic flux to insulate coil 23 of the module magnetically when it is housed in cavity 13 of back cover 3 of the metallic case. The base 15 is in the form of a dome and has a flat bottom 16 and an essentially cylindrical lateral wall 27 to surround the coil on two sides. The dome shaped base is mounted in said cavity such that the flat bottom 16 is arranged between the bottom of cavity 13 and coil 23 mounted on said base. Bottom 16 of the base can come into contact with the bottom of cavity 13.

A protective cover 28, which includes a bottom and a circular lateral wall 17 is provided for covering base 15 in order to enclose coil 23 and integrated circuit chip 24 secured to bottom 16 of base 15. The base can be fixed in the cover particularly by bonding or held mechanically by friction between the inner surface of wall 17 of the cover and the external surface of wall 27 of the base. When the electronic module is housed in said cavity 13, a part of the base of cover 28 projects slightly in relation to the external face 33 of the back cover 3 of case 1.

The material forming the protective cover 28 can be for example a plastic material such as high-density polyethylene or a ceramic material or sapphire. The plastic material is reserved more for lower and mid range watches, whereas ceramic or sapphire are reserved for top of the range watches. If the material is ceramic, the latter is preferably chosen to have substantially the same colour and appearance as the metal that forms the back cover of the case unless a particular aesthetic effect is sought.

As shown in FIG. 2a, the thickness of wall 17 of cover 28 increases slightly and continuously from its base to its top. Thus, the external surface 18 of wall 17 has a particular shape that enables it to cooperate with inner wall 19 of cavity 13, which has a complementary shape, to form eagletail or dovetail type assembly means.

Moreover, the outer edge 20 of wall 17 of the cover and the edge 21 of wall 19 of cavity 13 are rounded to facilitate introduction of module 14 into the cavity.

Figure 2B:
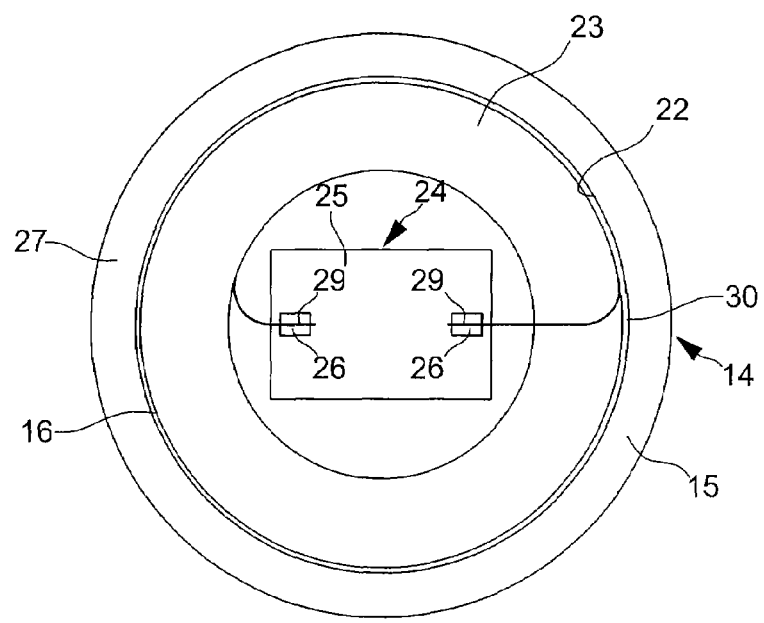

FIG. 2b is a bottom view of electronic module 14 of FIG. 2a without the presence of an adhesive filler material which will be mentioned hereinafter and the protective cover.

With reference to FIGS. 2a and 2b, it can be seen that lateral wall 27 of base 15 has a truly cylindrical inner surface 22, which surrounds an annular coil, more specifically a cylindrical, flat and self-supporting coil 23. This coil is formed in a known manner of several layers of contiguous and coaxial turns that are not visible in the drawing, made by means of a very thin metal wire, preferably made of copper. The coil wire is surrounded by a sheath or insulating and hot melt material which partially melts when heated. In this manner, all of the parts of the sheath that surround the wire turns are welded to each other when the coil is then allowed to cool.

Coil 23 itself surrounds an integrated circuit chip 24, in the form of a parallelepiped rectangle, smaller than the chip. Integrated circuit chip 24 has on its front surface 25 two connection terminals or bumps 26 onto which the two ends 29 of the metal wire of coil 23 are bonded or secured by thermo-compression or by means of a conductive adhesive.

As shown in FIGS. 2a and 2b, the two bumps 26 of chip 24 are arranged opposite each other lengthways in chip 24. However, it is clear that they could be placed differently on the front face of the chip, for example side by side widthways.

In this first embodiment, coil 23 and chip 24 are directly fixed onto the inner face 30 of flat bottom 16 of base 15 by means of a thin film of adhesive material 31. The space left free by the chip inside the coil is filled with an adhesive, insulating and thermosetting material 32, for example an epoxy resin. This protects the ends 29 of the wire of coil 23 and the means securing them to bumps 26 while they are not covered by protective cover 28 of module 14. Moreover, adhesive material 32 is preferably opaque in order to protect the chip against light also prior to incorporation.

Since back cover 3 of case 1 is made of a magnetic material, for example steel, or aluminium, base 15 acts as magnetic shielding between the back cover of the watchcase and the coil. Thus the electronic module, magnetic flux losses are greatly attenuated when the coil transmits or receives signals transmitted respectively to and from a read and/or write apparatus to which it can be coupled. Moreover, owing to the material selected for the base according to the invention, the maximum distance for reading and writing data is greater than with an insulating base. This distance can be greater than 8 mm if the module is placed in a metallic case cavity. The distance also depends on the transmitter and its antenna.

As FIG. 2a shows, module 14 projects slightly in relation to the outer face 33 of back cover 3 of case 1 to form a boss 34, provided to position rapidly and as well as possible a head 35 of a read and/or write apparatus. The head of this apparatus is represented partially and schematically by dotted lines in FIG. 2a. The head, which also includes a coil 36 acting as antenna, has recess 35' whose shape and dimensions correspond to those of boss 34. The head can be connected via an interface to an apparatus designed to communicate with the memory of the watch module. The apparatus can be a fixed or portable personal computer (PC).

Obviously, boss 34 of the module would also enable the watch to be similarly placed on a support having a recess corresponding to the shape and dimensions of the boss.

Moreover, when the module projects in relation to the back cover of case 1, its external edge is preferably rounded to prevent boss 34 causing any inconvenience for the person wearing the watch. However, a chamfer could simply be provided instead of the rounded part.

The broadcast waves transmitted and received by coil 23 of module 14 no longer have to pass through the entire thickness of the metallic back cover 3 of watchcase 1, but only that of the bottom of module cover 28 which is much thinner. Thus, these waves will be much less attenuated and deformed than in the case of known watches in which the electronic module is placed at the bottom but inside the case.

Since it is necessary to have a highly permeable material to act as magnetic shielding, the material used for the base can be formed of ferrite or a nickel, iron, copper and molybdenum alloy. Preferably, the alloy is formed of 70 to 80% nickel and 10 to 20% iron. A material known by the trademark Mumétal® can be used.

The base material can also be formed of pure soft iron for example known by the trademark Sulem®.

With these types of materials used for the base, it is possible to increase the distance separating the read and/or write apparatus from the module for data read and/or write operations from the integrated circuit chip memory.

In the table hereinbelow, the maximum distances between a read and/or write apparatus and an electronic module (TAG) are shown for reading and/or writing data as a function of the watchcase material and the material forming the base.

|  | Insulating back cover | Steel back cover | Aluminium back cover |
| --- | --- | --- | --- |
| Insulating base | 9 mm | 6.5 mm | 1.5 mm |
| Mumetal base | 16 mm | 9.7 mm | 9.7 mm |
| Sulem base | 13 mm | 8.5 mm | 8 mm |

It will be noted in the above table that with a base made of a highly permeable material, the maximum distance for data reading and writing is greater than 8 mm whatever the back cover on which the electronic module is placed. If the watch is placed in a wrapping case, this means that data can also be read and written through said case.

Integrated circuit chip 24 can comprise one or several types of memory for storing data. It may be for example a memory for storing read-only data or a memory for storing other data which can also be deleted and/or altered or completed by additional data.

This is the case in the application example provided previously where the electronic module can store data which concern the watch itself, more specifically, its origins, its purchaser and, as for a car, its "maintenance manual", which personalise it. This can be a selling point and thus facilitate the work of a watchmaker when the watch is given to him for a check, repair or simply changing the battery if the watch is of the electromechanical or electronic type.

For mid or top of the range watches, the data stored in the electronic module can be divided for example into four categories. A first category concerns the trademark or model of the watch sold, and a date and shipping address for the watch to a retailer. A second category concerns the manufacturing plant particularly of the watch movement. A third category concerns the point of sale references. Finally, a fourth category concerns the client services relating for example to the various operations carried out on the watch by the salesperson or retailer.

Some of this data can be stored in a ROM type memory to be read only. This is the case for example for the aforementioned first and second categories.

The data in the other two categories can be stored in one or several dynamic memories of the RAM, EPROM or EEPROM type so as to be deleted, altered or completed.

In all cases, the coil of a reader head or support can be connected via a suitable interface to a fixed or portable computer which enables the data contained in the memory or memories of the module to be read and if possible some of the data to be deleted, altered or completed.

Thereafter, the data can be disseminated on a protected Internet site or on an Intranet loop that can be accessed by all persons concerned by the watch.

Figure 3:
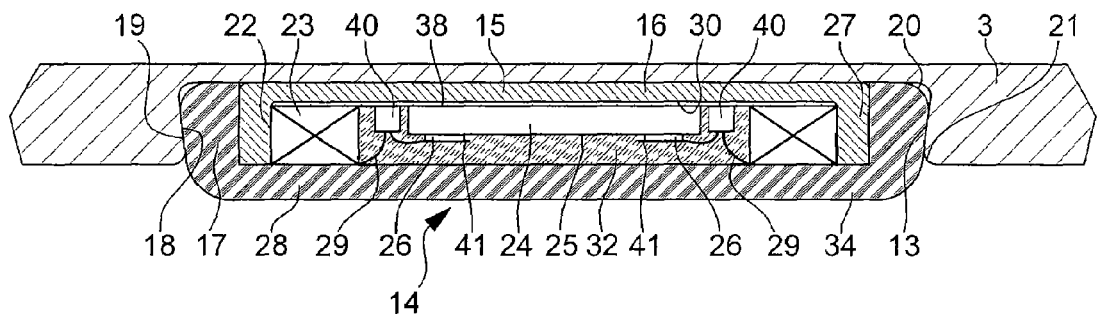
FIG. 3 is an enlarged diametral cross-section of the area of the back cover of the case of FIG. 1 in which an electronic module according to a second embodiment is incorporated.

FIG. 3 is a similar view to FIG. 2a which shows a second embodiment of the electronic module of a watch according to the invention. In this Figure, the same elements are designated by the same references and only new parts are indicated by new references.

One of the differences of this second embodiment in relation to that shown in FIG. 2a is that coil 23 and circuit 24 are no longer directly bonded onto the inner face 30 of bottom 16 of base 15, but on the substrate of a printed circuit 38. This substrate could also be bonded onto bottom 16 of base 15 of module 14 or simply driven inside the base.

The other difference is due to the fact that the ends of wire 19 of coil 23 no longer directly connect the coil to bumps 26 of integrated circuit chip 24 but via connection bumps 40 formed on the substrate of printed circuit 38. More specifically, each end of wire 29 is bonded or fixed by thermocompression or bonded by means of an electrically conductive adhesive onto one of bumps 40 and the latter is in turn connected to a bump 26 of integrated circuit chip 24 by a conductive wire 41.

Consequently, coil 23 and integrated circuit chip 24 can be electrically connected by using the conventional automated wire bonding method.

Figure 4:
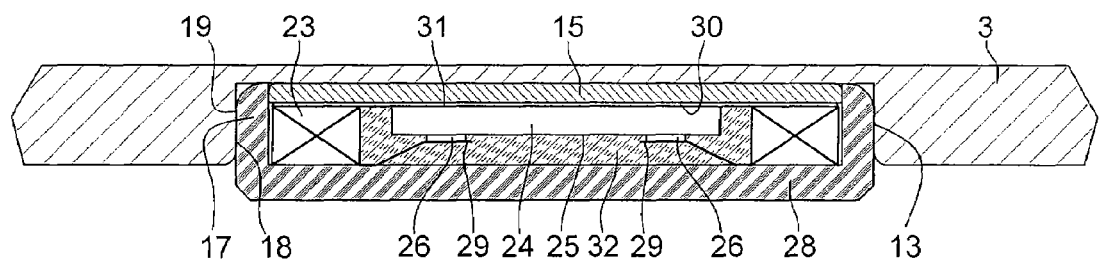
FIG. 4 is an enlarged diametral cross-section of the area of the back cover of the case of FIG. 1 in which an electronic module according to a third embodiment is incorporated.

In the third embodiment shown in cross-section in FIG. 4, the outer surface 18 of lateral wall 17 of cover 28 and the inner wall 19 of cavity 13 of back cover 3 of the watchcase are both cylindrical. Module 14 is secured inside the cavity by being set in or bonded. Moreover, the outer edge of wall 17 of cover 28 is not rounded as in the first embodiment of FIGS. 2a and 2b, but has a chamfer.

In this third embodiment, the metallic base 15 is a rigid plate, which carries coil 23 and integrated circuit chip 24. The base is inserted in cover 28 in order to enclose said coil and said chip. As for the previous embodiments described hereinbefore, the base is positioned between the coil and the bottom of cavity 13 to magnetically shield the coil. However, base 15 only covers one surface of the coil and is thus less efficient than the dome-shaped base described hereinbefore. This rigid plate 15 can have a slightly greater external diameter than that of coil 23.

This embodiment is better suited when back cover 3 of the case and/or cover 28 of module 14 are formed of hard materials that are difficult to machine or shape.

Moreover, in this third embodiment as in those of FIGS. 2a and 2b, the wire ends 29 of coil 23 are directly fixed onto bumps 26 of integrated circuit chip 24, but it is clear that these wire ends and bumps 26 could be connected in the same way as in the embodiment of FIG. 3.

It should be noted that in another embodiment that is not shown in the drawing, module 14 could be fixed in cavity 13 of back cover 3 of the case by crimping. Cover 28 of the module would then have on its bottom side an outer peripheral notch in which an inner edge of back cover 3 could engage. This method of securing the module could be used for example when bonding and setting in are not possible.

Figure 5:
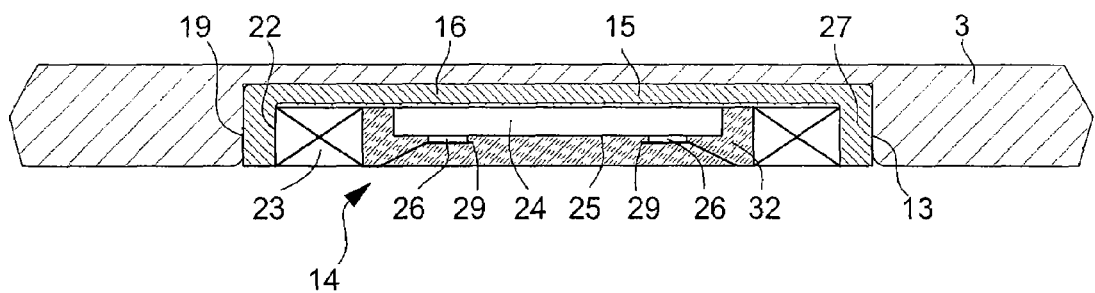
FIG. 5 is an enlarged diametral cross-section of the area of the back cover of the case of FIG. 1 in which an electronic module according to a fourth embodiment is incorporated.

In the fourth embodiment of the electronic module, shown in FIG. 5, the dome-shaped metallic base 15 for magnetic shielding, as shown in FIGS. 2a and 3, is not covered with a protective cover. Said module is only protected against mechanical damage by the encapsulation resin 32 of integrated circuit chip 24 and the insulation of wires of coil 23. However, unlike the preceding embodiments, there is no part of said module 14, introduced into said cavity 13 of complementary shape to base 15, projecting outside said cavity 13. Module 14 can be set into or bonded inside cavity 13 of the back cover of the case.

For this fourth embodiment, the comment made previously in relation to the connection of the ends of the coil wire and the bumps of the integrated circuit chip is also valid.

However, instead of connecting the ends of the coil wire to the bumps of the integrated circuit chip as described hereinbefore, this connection could be obtained by using a tape automatic bonding or TAB, which is disclosed in EP Patent No. 0 376 062. This method can also be applied for modules fitted to watches with metallic cases, such as wristwatches.

Figure 6A:
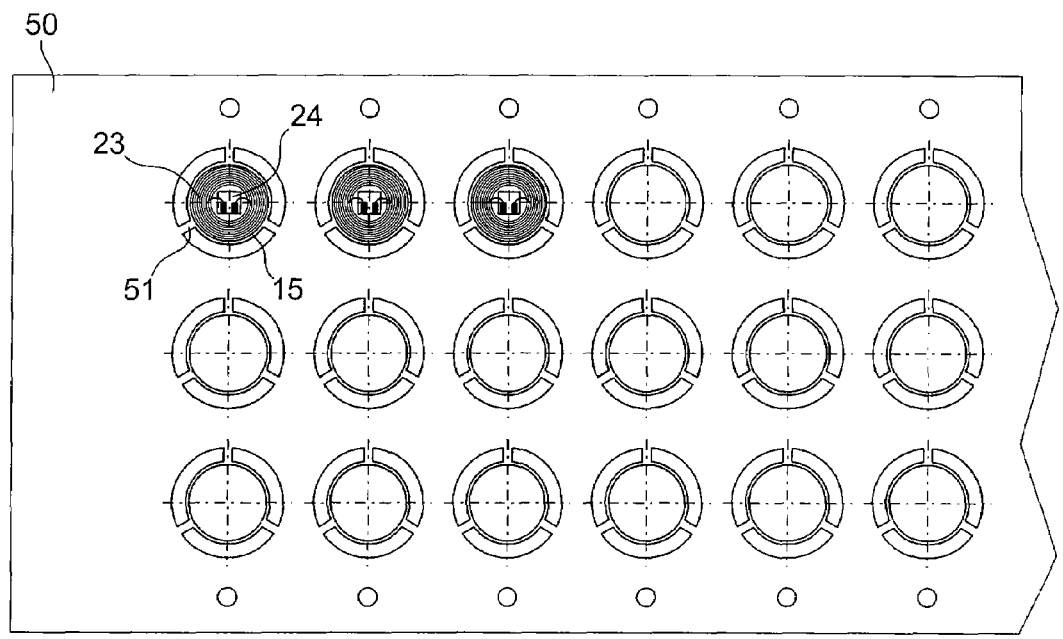
FIGS. 6a and 6b show a top view and a side view of a bar comprising several magnetic shield domes in each of which a coil and an integrated circuit chip are mounted to allow assembly of the electronic modules to be automated.
Figure 6B:
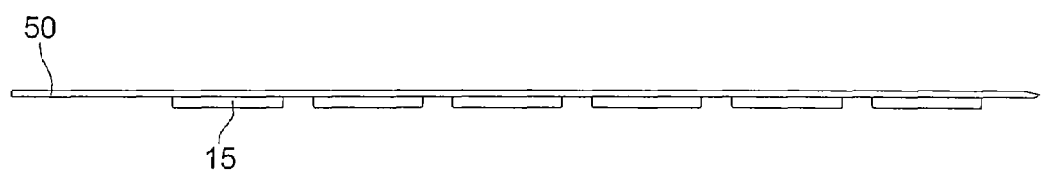

FIGS. 6a and 6b show only a bar 50 of a metal alloy which can easily be machined or stamped so that the assembly of the electronic module components can be automated. This bar 50 can for example be made of pure soft iron or an alloy of the Mumetal® brand. With this type of metal material, it is easy to make several bases 15 in the form of domes in the bar. Each base is held to the rest of the bar for example by three bridges 51.

In the electronic module manufacturing steps, a coil 23 and an integrated circuit chip 24 are fixed in each dome 15. Subsequently, connection wires connect the contact terminals of the integrated circuit chip to the ends of the coil. Resin is then applied onto the chip in order to also fill the free space between the coil and the integrated circuit chip. Once all of the electronic modules are finished in bar 50, they can be separated in succession from the bar. Each base can then be covered by a protective cover before the module is introduced into a cavity in the bottom of a watchcase. All of these operations can be automated to save production time for these watches with an electronic module.

From the description that has just been made, multiple variants of the watch with a metallic case or of the electronic module can be devised by those skilled in the art without departing from the scope of the invention defined by the claims. The electronic module can be entirely housed in an external cavity of the watch without any projecting parts, but with positioning means provided for a reader head. Moreover, in these embodiments and variants, the electronic module is permanently fixed in the cavity. However, it would be possible to devise a module with a protective cover for the metallic base, which is provided with a lateral wall enabling it to cooperate with an inner wall of the cavity so as to make the module removable and interchangeable. The module could be for example screwed in or fixed by a bayonet system.

The coil and the integrated circuit chip can be fixed in the protective cover prior to being mounted on the metallic base. The coil can be of a different shape to a circular ring. It can be made in rectangular form, or describing a portion of a loop around the integrated circuit chip.

The base can include a diametral slot in order to prevent any interference by Foucault currents.

The invention claimed is:

1. A watch with a metallic case including an electronic module for storing data, which is housed at least mostly in a cavity open towards the exterior in an external surface of the watch, said cavity being of complementary shape to said module, said module being able to communicate via broadcast signals with a read and/or write apparatus for said data, said module including a base on which are mounted an integrated circuit chip having at least two bumps and a coil acting as a transmission and/or reception antenna, said coil being formed by an electrically conductive wire having two ends respectively connected to said bumps of said integrated circuit chip, said coil surrounding a space in which said chip is placed, wherein the base of the electronic module is a metallic element that conducts magnetic flux to insulate the module coil magnetically from the metallic case during data communication between a read/write apparatus and said module, and wherein said module and said cavity that is open towards the exterior housing said module define means for quickly and precisely positioning a complementary-shaped head of a read and/or write apparatus.

2. The watch according to claim 1, wherein the base of the module is made of pure iron or a material including a nickel, iron, copper and molybdenum alloy, the alloy being composed particularly of 70 to 80% nickel and 10 to 20% iron.

3. The watch according to claim 1, wherein said cavity and said module have an essentially cylindrical shape and are located substantially in the centre of the back cover of said case.

4. The watch according to claim 1, wherein said base is dome-shaped and has a flat bottom onto which said coil of annular shape and said integrated circuit chip are placed and a lateral wall surrounding said coil, the height of the lateral wall counted from the inner surface of the flat bottom being greater than or equal to the thickness of the coil or the chip, and wherein the base is housed in a cavity of an external surface of the watch between the inner surface of the cavity and the coil.

5. The watch according to claim 1, wherein the electronic module includes a protective cover having a bottom and a circular lateral wall, said cover being placed on said bottom to enclose the coil and the integrated circuit chip via said base, wherein said cover is made of plastic or ceramic material or sapphire, wherein the lateral wall of the cover is fixed mostly inside said cavity, the bottom of said cover projecting in part outside said cavity, and wherein said module is secured by setting in said protective cover into said cavity or by bonding in said cavity or by crimping in said cavity.

6. The watch according to claim 1, wherein the thickness of said lateral wall of the cover slightly and continuously increases from its base to its top so as to have an external surface able to cooperate with a complementary-shaped inner wall of said cavity in order to form dovetail type assembly means between said electronic module and the cavity in the watch surface.

7. The watch according to claim 5, wherein said lateral wall of the cover has a cylindrical external surface and said cavity has an inner wall that is also cylindrical.

8. The watch according to claim 1, wherein said base is formed by a substantially circular rigid plate on which are fixed said annular-shaped coil and said integrated circuit chip, said base being positioned between the external watch surface and the coil.

9. The watch according to claim 1, wherein said coil and said integrated circuit chip are directly secured by bonding onto said base and wherein said ends of the coil wire are also directly fixed onto said bumps of the integrated circuit chip by means of an electrically conductive material.

10. The watch according to claim 1, wherein said coil and said integrated circuit chip are fixed onto the substrate of a printed circuit, and wherein said printed circuit has two connection bumps located between said coil and said chip, onto which said ends of said coil wire are fixed and two ends or two conductive wires whose other ends are fixed onto said bumps of said chip.

11. The watch according to claim 1, wherein said module housed in the cavity has a part projecting outside the back cover of said case to define means for quickly and precisely positioning a complementary-shaped head of a read and/or write apparatus.

12. An electronic module for a watch according to claim 1, the module including a base on which are mounted an integrated circuit chip having at least two bumps and a coil acting as a transmission and/or reception antenna, said coil being formed by an electrically conductive wire having two ends respectively connected to said bumps of said integrated circuit chip, said coil surrounding a space in which said chip is placed, wherein the base is a metallic element that conducts magnetic flux to act as a magnetic shield.

13. The module according to claim 12, wherein it includes a protective cover placed on said base to enclose the coil and the integrated circuit chip using said base, said cover being made of plastic or ceramic material, or sapphire.

* * * * *